United States Patent [19]
Delisle

[11] Patent Number: 5,133,268
[45] Date of Patent: Jul. 28, 1992

[54] TREE SCOOPER

[76] Inventor: Gilles Delisle, P.O. Box 849, Mesilla Park, N. Mex. 88047

[21] Appl. No.: 763,162

[22] Filed: Nov. 4, 1991

[51] Int. Cl.⁵ .............................................. A01G 23/04
[52] U.S. Cl. ..................................... 111/101; 37/2 R; 37/118 R
[58] Field of Search ................... 37/117.5, 2 R, 118 R; 111/101

[56] References Cited

U.S. PATENT DOCUMENTS

| | | | |
|---|---|---|---|
| 2,703,044 | 3/1955 | Adair | 37/2 R X |
| 2,770,076 | 11/1956 | Kluckholm | 37/2 R |
| 3,032,123 | 5/1962 | Brown | 111/101 |
| 3,623,245 | 11/1971 | Adams | 37/2 R |
| 4,271,611 | 6/1981 | Paul | 111/101 |
| 4,321,761 | 3/1982 | Hedblom | 37/2 R |

Primary Examiner—Randolph A. Reese
Assistant Examiner—Arlen L. Olsen

[57] ABSTRACT

The tree scooper is a mechanical device which shapes a root ball as a plant is being dug. The tree scooper includes an H-mount with internally mounted hydraulic cylinders, a power slider for linear motion along the H-mount and a sleeved hinge used to attach a scoop to the power slider. The tree scooper is operated by a combined rotating and back-sliding action for forming a root ball. The scoop is interchangeable for varying the size and shape of the root balls.

7 Claims, 3 Drawing Sheets

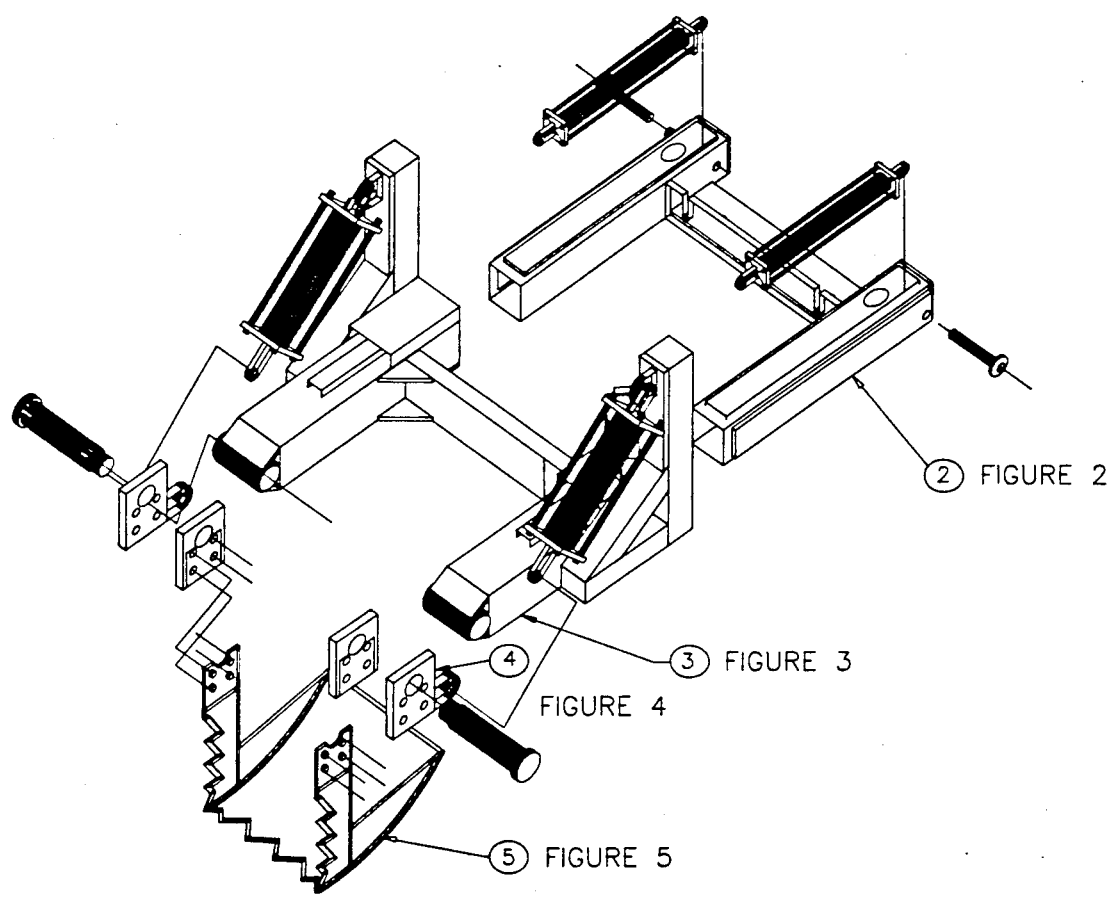

TREE SCOOPER

BACKGROUND OF THE INVENTION

The nursery industry has long been faced with the problem of digging field-grown stock for containerization, such containers being flat-bottomed with a slight taper toward the top. Traditionally, this has been done manually with a shovel. A root-ball is dug and shaped so that it will approximate the shape and size of the container in which it is to be placed. The common mechanized way of doing the same thing has been to use a tree spade which forms a conical root ball which then has to be manually reshaped to fit the standard flat-bottomed, slightly tapered nursery containers. Both operations are time-consuming and expensive.

SUMMARY OF THE INVENTION

The tree scooper is a mechanical device which shapes a root ball as it is being dug. It addresses the nursery industry or any industry where there is a need for digging plants and creating a root ball having a specific size and shape. The tree scooper claims: (1) to be able to dig plants more rapidly than by manual digging or digging by other types of digging machines such as tree spades; (2) to offer flexibility in sizing root balls because of a design which allows for the exchanging of scoops of different sizes and shapes; and (3) to allow for the shaping of root balls during and as a part of the digging process.

BRIEF DESCRIPTION OF DRAWINGS

FIG. 2 is an isometric view of the H-mount.

FIG. 3 is an isometric view of the power-slide.

FIG. 4 is an isometric view of the hinges.

FIG. 5 is an isometric view of the scoop.

DETAILED DESCRIPTION OF THE PREFERRED EMBODIMENT

The present invention will be more fully understood by reference to the following detailed description when read in conjunction with the attached drawings.

FIG. 2 is the H-mount which bolts to a standard hydraulically articulated beam on a tractor. A blade, bucket, or front end loader is often mounted on such a beam.

FIG. 3 is a power-slider which is attached to the hydraulic cylinders inside the square tubes of the H-mount. When activated, these cylinders move the power-slider back and forth on the H-mount. The power-slider also has a pair of cylinders which attach to a hinge (FIG. 4). When activated, they cause a rotating motion of about 150 degrees.

FIG. 4 is the hinge. There are two hinges and each attaches to the end of the power-slider by means of a pin. The cylinder attaches to the hinge at the tab. The hinge has an insert allowing for the interchangeability of Scoops.

FIG. 5 is the Scoop. It slides into an insert in the hinge and is fastened by bolts. Scoops of different sizes and shapes are interchangeable. The size and shape of the scoop in part determines the size and shape of the root ball that will be dug. This, when combined with the movement of the power-slider on the H-mount, allows for the shaping of the root ball. Every angle of the teeth on the scoop is such that a slicing action rather than a chopping action results, thereby minimizing disturbance to the roots. Those same angles also make the scoop self-sharpening.

Figure 1:
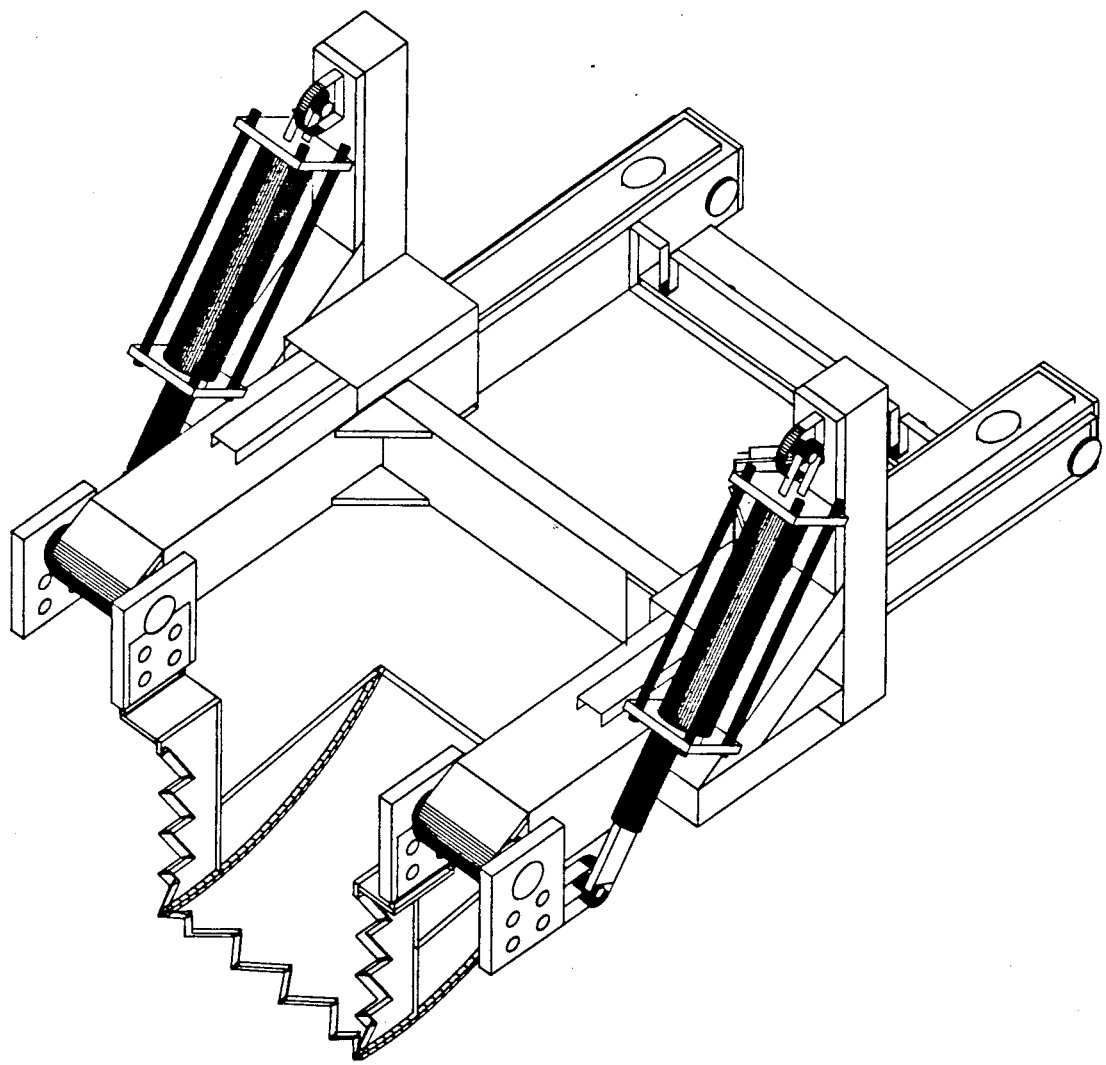
FIG. 1 is an isometric view of the tree scooper in its assembled state.
Figure 6:
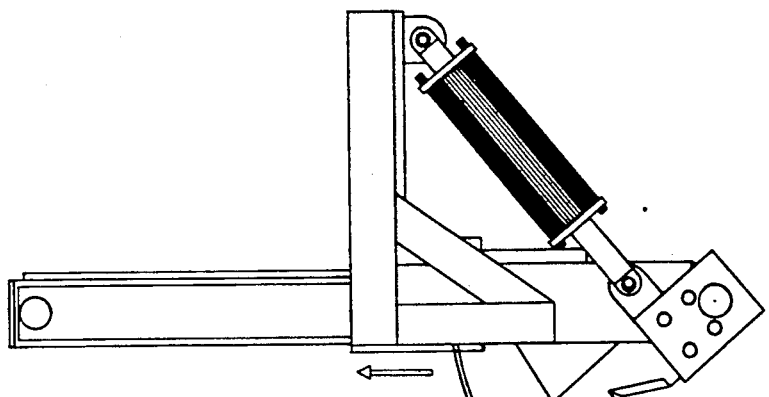
FIG. 6 is a side view of the power slider in an extended position on the H-mount.

FIG. 6 shows the power-slider in a fully extended position on the H-mount. The scoop is at the onset of rotation with the hydraulic rams closed. At this point, the scoop is also positioned around the plant to be dug.

Figure 7:
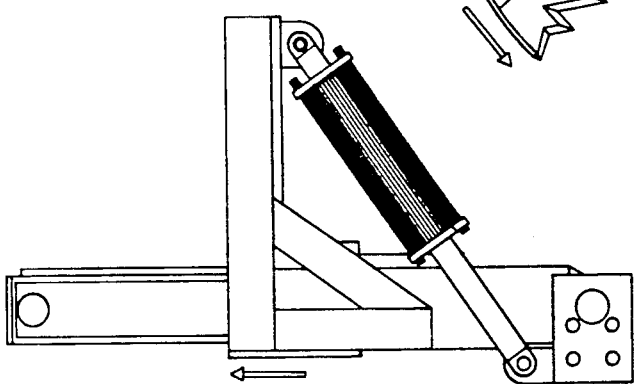
FIG. 7 is a side view of the combined rotating and backsliding of the tree-scooper.

FIG. 7 depicts the scoop as having been activated through approximately one-half of its arc (approx. 75 degrees of rotation) and the power-slider having been simultaneously pulled back approximately one-half of its travel distance on the H-mount.

Figure 8:
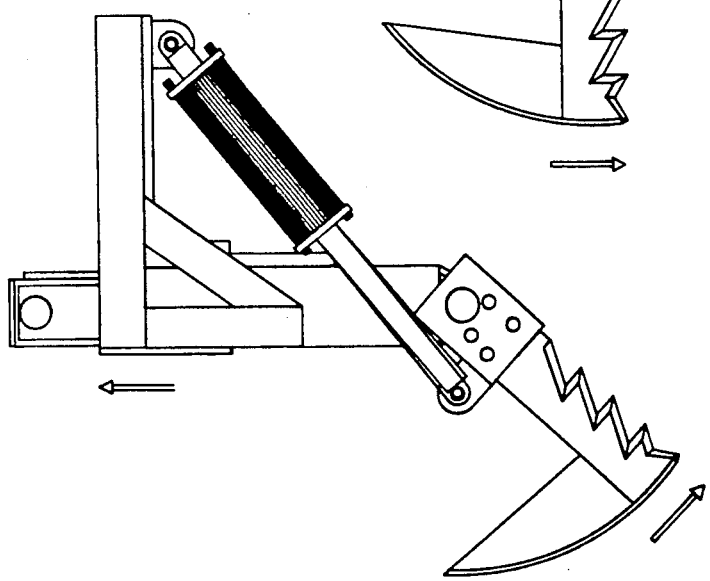
FIG. 8 is a side view of the tree-scooper at the end of rotation and back-sliding.

FIG. 8 shows the scoop at the end of rotation with the hydraulic rams open. Simultaneously, the power-slider has pulled back through the remainder of its travel distance on the H-mount. At this point, the plant is ready to be scooped out by lifting the trees scooper up from the ground using the hydraulically articulated beam to which it is mounted. The shape and size of the root ball can be changed by varying the speed and timing of the pull-back action of the power-slider relative to the digging action of the Scoop. It can be further modified by exchanging Scoops of varying sizes and shapes.

I claim:

1. A mechanical plant-scooping device for the sizing and shaping of a root ball of a plant comprising:
   a) an H-mount including internally mounted actuators;
   b) a slide mechanism being slidingly coupled to said H-mount and including externally mounted actuators;
   c) a sleeved hinge; and
   d) a scoop attached to said slide mechanism by said hinge, whereby said hinge is adapted to attach a plurality of different shaped and sized scoops to said slide mechanism for forming a plurality of different sized and shaped root balls.

2. The mechanical device of claim 1, wherein said H-mount and said slide mechanism are slidingly connected in a linear direction.

3. The mechanical device of claim 1, wherein said sleeved hinge includes means for interchanging scoops of different sizes.

4. The mechanical device of claim 3, wherein the means for interchanging is a bolt-locking sleeve.

5. The mechanical device of claim 1, wherein the scoop has a plurality of teeth.

6. The mechanical device of claim 5, wherein the teeth are angular such that they provide a slicing action and are self-sharpening.

7. The mechanical device of claim 6, wherein the H-mount is attached to a tractor.

* * * * *